(12) United States Patent
Natanzon

(10) Patent No.: US 9,471,579 B1
(45) Date of Patent: *Oct. 18, 2016

(54) REPLICATING SELECTED SNAPSHOTS FROM ONE STORAGE ARRAY TO ANOTHER, WITH MINIMAL DATA TRANSMISSION

(71) Applicant: EMC Corporation, Hopkinton, MA (US)

(72) Inventor: Assaf Natanzon, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,239

(22) Filed: Jul. 18, 2014

Related U.S. Application Data

(63) Continuation of application No. 13/168,391, filed on Jun. 24, 2011, now Pat. No. 8,805,786.

(51) Int. Cl.
*G06F 17/30* (2006.01)

(52) U.S. Cl.
CPC ... *G06F 17/30088* (2013.01); *G06F 17/30067* (2013.01)

(58) Field of Classification Search
CPC .............................................. G06F 17/30067
USPC ....... 707/622, 639, 640, 641, 645, 646, 652, 707/653; 711/161, 162; 714/15
See application file for complete search history.

(56) References Cited

U.S. PATENT DOCUMENTS

| | | | |
|---|---|---|---|
| 5,901,327 A * | 5/1999 | Ofek | 710/5 |
| 6,076,148 A * | 6/2000 | Kedem | 711/162 |
| 7,275,177 B2 * | 9/2007 | Armangau et al. | 714/5.1 |
| 7,383,463 B2 * | 6/2008 | Hayden et al. | 714/4.11 |
| 7,577,867 B2 * | 8/2009 | Lewin et al. | 714/6.32 |
| 7,607,037 B1 * | 10/2009 | LeCrone et al. | 714/6.23 |
| 8,214,612 B1 * | 7/2012 | Natanzon | 711/162 |
| 8,996,461 B1 * | 3/2015 | Natanzon et al. | 707/634 |
| 2005/0015663 A1 * | 1/2005 | Armangau et al. | 714/15 |
| 2006/0206542 A1 * | 9/2006 | Wolfgang et al. | 707/203 |
| 2007/0220311 A1 * | 9/2007 | Lewin et al. | 714/6 |

OTHER PUBLICATIONS

K. Renuga et al., Balanced and Efficient Data Placement and Replication Strategy for Distributed Backup Storage Systems—2009, IEEE. vol. 1, 87-94.*

* cited by examiner

*Primary Examiner* — Jean B Fleurantin
(74) *Attorney, Agent, or Firm* — Krishnendu Gupta; Robert Kevin Perkins; Gerald P. Kazanjian

(57) ABSTRACT

Example embodiments of the present invention provide methods for replicating a production site snapshot to a replication site. A first example embodiment creates a snapshot of the production volume at the production site and creates a bookmark in a do metadata stream. The bookmark may be sent to the replication site and, when processed from the do metadata stream at the replication site, cause the replication site to create a snapshot of the replication volume according to the bookmark. A second example embodiment replicates to a replication site snapshot by generating a list of differences between the production site snapshot and the replication site snapshot and performs replication according to the differences. The differences may include differences between the production site volume and the production site snapshot, differences between the production site volume and the replication site volume and differences between the replication site volume and the replication site snapshot.

28 Claims, 7 Drawing Sheets

REPLICATING SELECTED SNAPSHOTS FROM ONE STORAGE ARRAY TO ANOTHER, WITH MINIMAL DATA TRANSMISSION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

An example embodiment of the present invention provides a method, a system and a computer-program product for replicating a snapshot of a production volume at a production site storage array to a snapshot of a replication volume at a replication site storage array. The method includes notifying a production site replication appliance to quiesce commands received by the replication appliance. A snapshot of the production volume at the production site storage array is then created and a bookmark is created at the production site, to be sent to the replica site and written in a do metadata stream of a journal maintained at the replication site. The production site replication appliance is then notified to unquiesce commands received by the production site replication appliance.

Another example embodiments of the present invention provide a method, a system and a computer-program product for replicating a snapshot of a production volume at a production site storage array to a snapshot of a replication volume at a replication site storage array. The method includes generating a list of differences between the production site snapshot and the replication site snapshot and performing replication from the production site snapshot to the replication site snapshot according to the list of differences.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
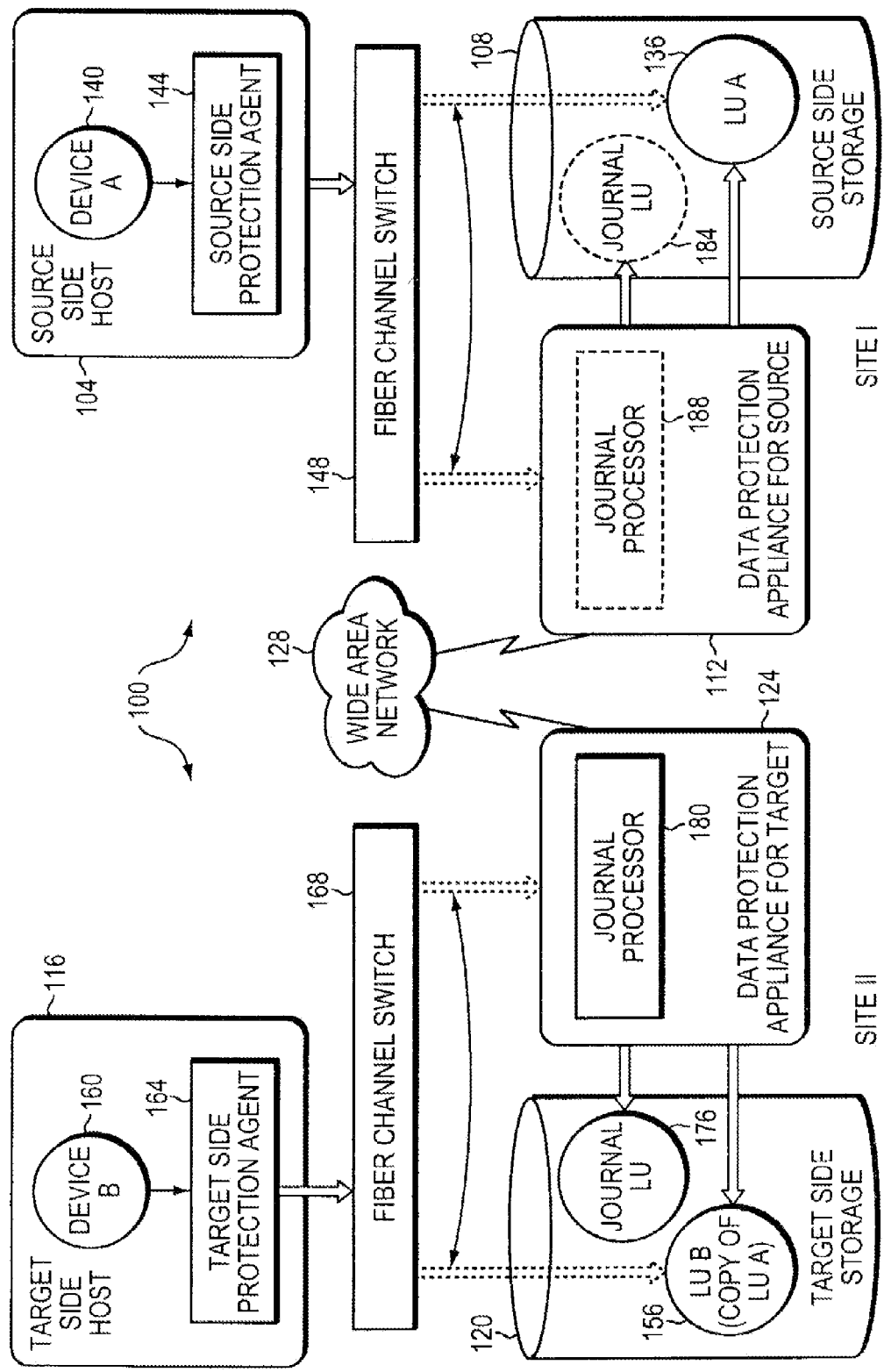
FIG. 1 is a simplified illustration of a data protection system, in accordance with an embodiment of the present invention.

Journaling uses significant amounts of the volume on which the journal is stored. Conventionally, replication systems dynamically add storage for a journal, as described in U.S. Pat. No. 7,840,536, entitled "METHODS AND APPARATUS FOR DYNAMIC JOURNAL EXPANSION ASSIGNED," issued on Nov. 23, 2010 and assigned to EMC Corporation of Hopkinton, Mass., which is hereby incorporated by reference in its entirety. However, such conventional journaling mechanisms lack efficient methods to decrease the size of the journal.

Accordingly, example embodiments of the present invention leverage the punch command and thin LUNs in order to create a fully dynamic journal which can shrink and grow on demand. The journal may be assigned a maximum allowed size, as well as a journal protection window defining a period for which the journal should retain journal information. A set of currently used blocks will be used and, if protection window is large enough, the oldest data blocks from an undo stream will be punched out from the stream. The blocks may be large journal blocks of a direct LUN (DLUN). DLUNs are LUNs which thin having large volume chunks (e.g., 128 MB or 1 GB). Accordingly, the punch command punches large slices out of the LUN; however, the chunks are big enough that sequential IOs remain sequential, thereby increasing performance. A manager may monitor how much free space there is in the storage pool and regulate the journal growth if the pool is nearly empty. Additionally, the journal capacity may also depend on the actual usage of the replicated LUNs if the replicated LUNs are thin (i.e., maintain the journal at a particular percentage of the used storage capacity).

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112.

Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
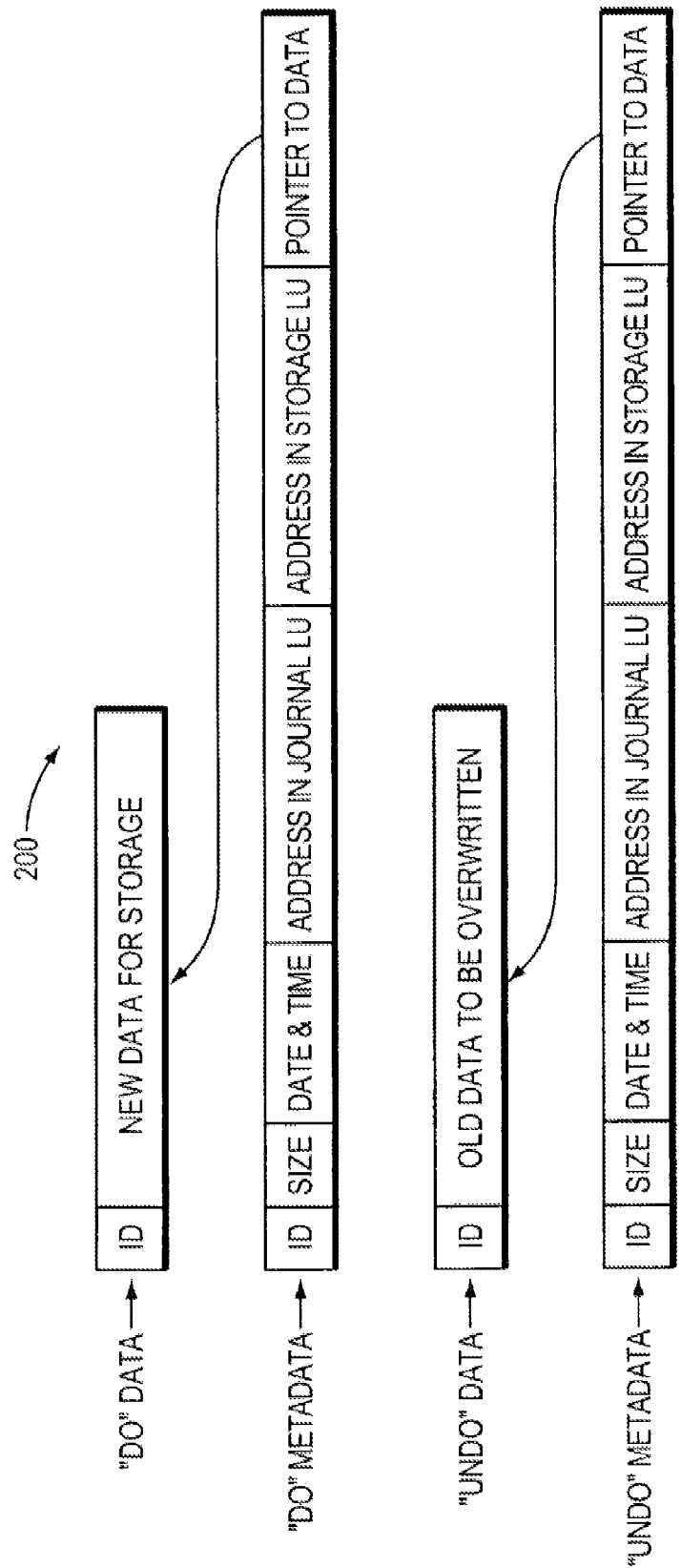
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805, entitled "PROTECTION OF MIRRORED DATA," issued on Mar. 18, 2008 and assigned to EMC Corporation of Hopkinton, Mass., which is hereby incorporated by reference in its entirety.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of dynamically adding storage for a journal may be found in U.S. Pat. No. 7,840,536, entitled "METHODS AND APPARATUS FOR DYNAMIC JOURNAL EXPANSION," issued on Nov. 23, 2010 and assigned to EMC Corporation of Hopkinton, Mass., which is hereby incorporated by reference in its entirety.

Replicating Selected Snapshots from One Storage Array to Another, with Minimal Data Transmission RecoverPoint by EMC Corporation of Hopkinton, Mass. provides a journal, as described above, which allows rolling the volume data for transitioning to any point in time during the protection window provided by the journal. The journal may include bookmarks for accessing any point in time in the journal. For example, a bookmark may indicate a point in time that a snapshot of the production volume was taken. In certain scenarios, a user may want one or more snapshots created at the production site to be replicated to the replication site journal at the same point in time.

A first example embodiment is described below with reference to the flow diagrams of FIGS. 3A-3B together with the block diagram of FIG. 4. A second example embodiment is described below with reference to the flow diagrams of FIGS. 5A-5D together with the block diagram of FIG. 6.

Figures 3A, 3B:
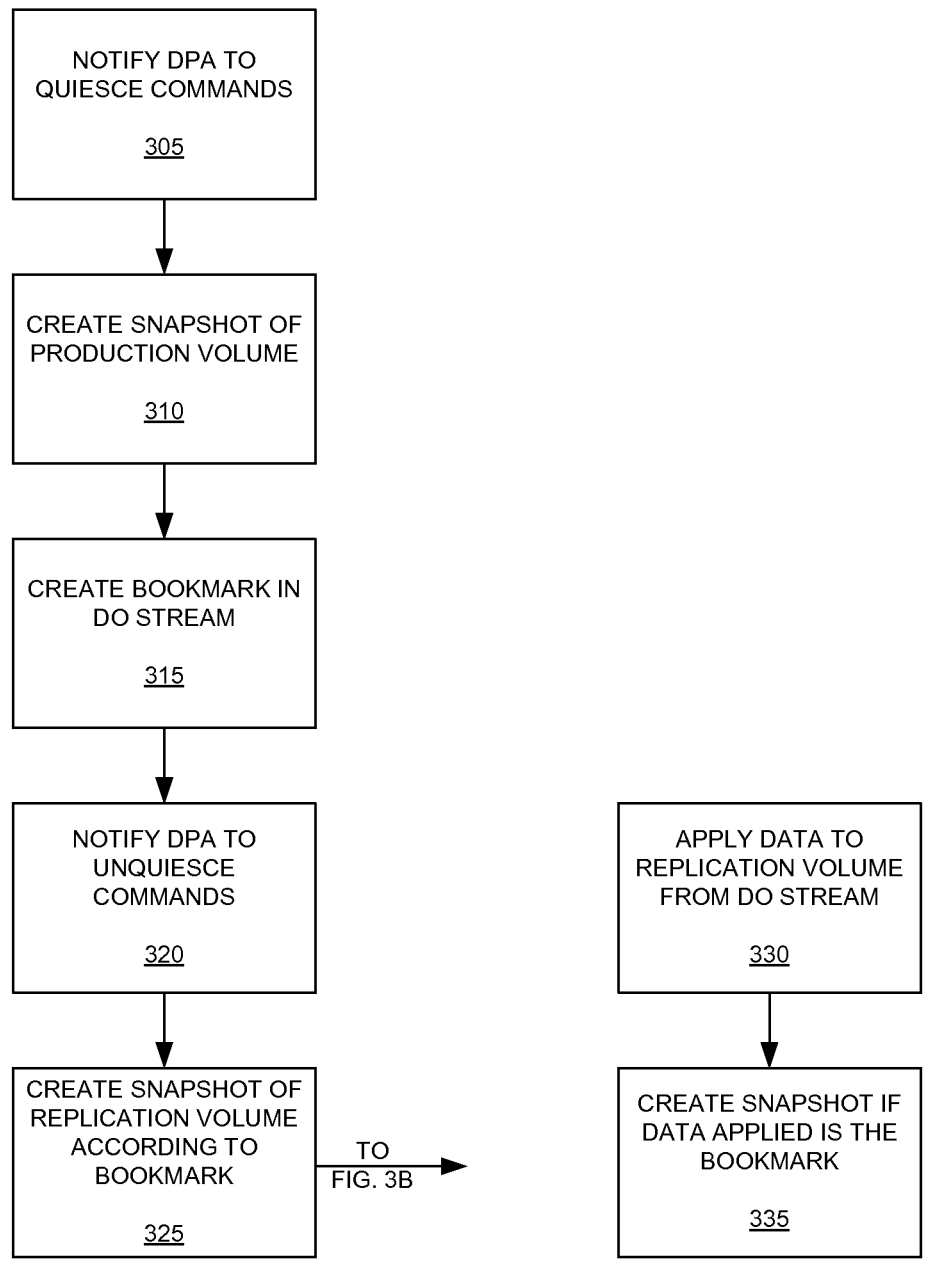
FIGS. 3A-3B and 5A-5D are flow diagrams illustrating respective example methods for replicating a snapshot of a production volume at a production site storage array to a snapshot of a replication volume at a replication site storage array according to an example embodiment of the present invention.

FIGS. 3A-3B are flow diagrams illustrating example methods for replicating a snapshot of a production volume at a production site storage array to a snapshot of a replication volume at a replication site storage array according to an example embodiment of the present invention. The flow diagrams of FIGS. 3A-3B may be read in conjunction with the block diagram of FIG. 4 illustrating a replication environment 400 including a production site and a replication site, with a snapshot S at the production site being replicated to a replica snapshot S' at the replication site.

Figure 4:
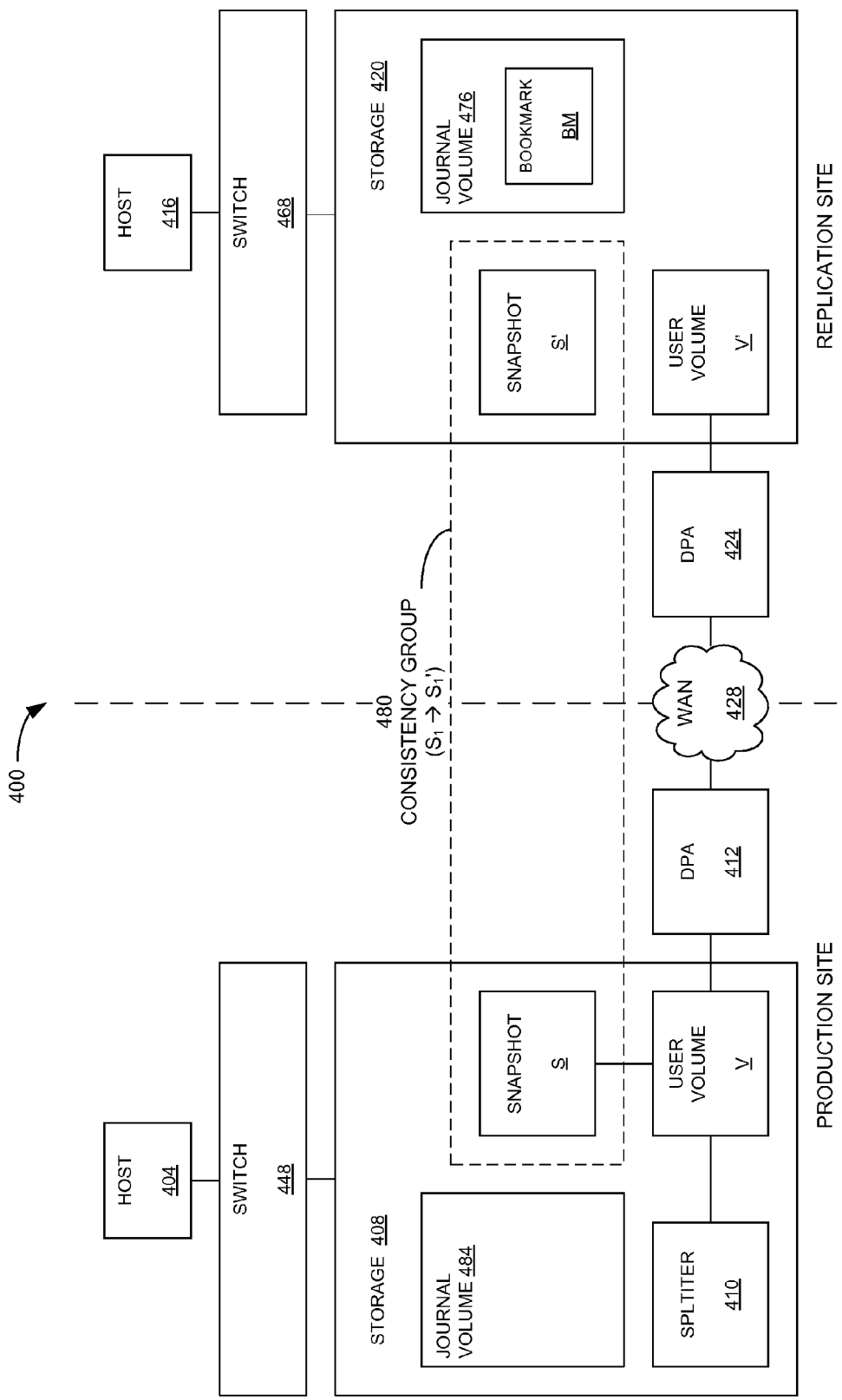
FIGS. 4 and 6 are block diagrams illustrating respective example systems for replicating a snapshot of a production volume at a production site storage array to a snapshot of a replication volume at a replication site storage array according to an example embodiment of the present invention.
Figure 5:
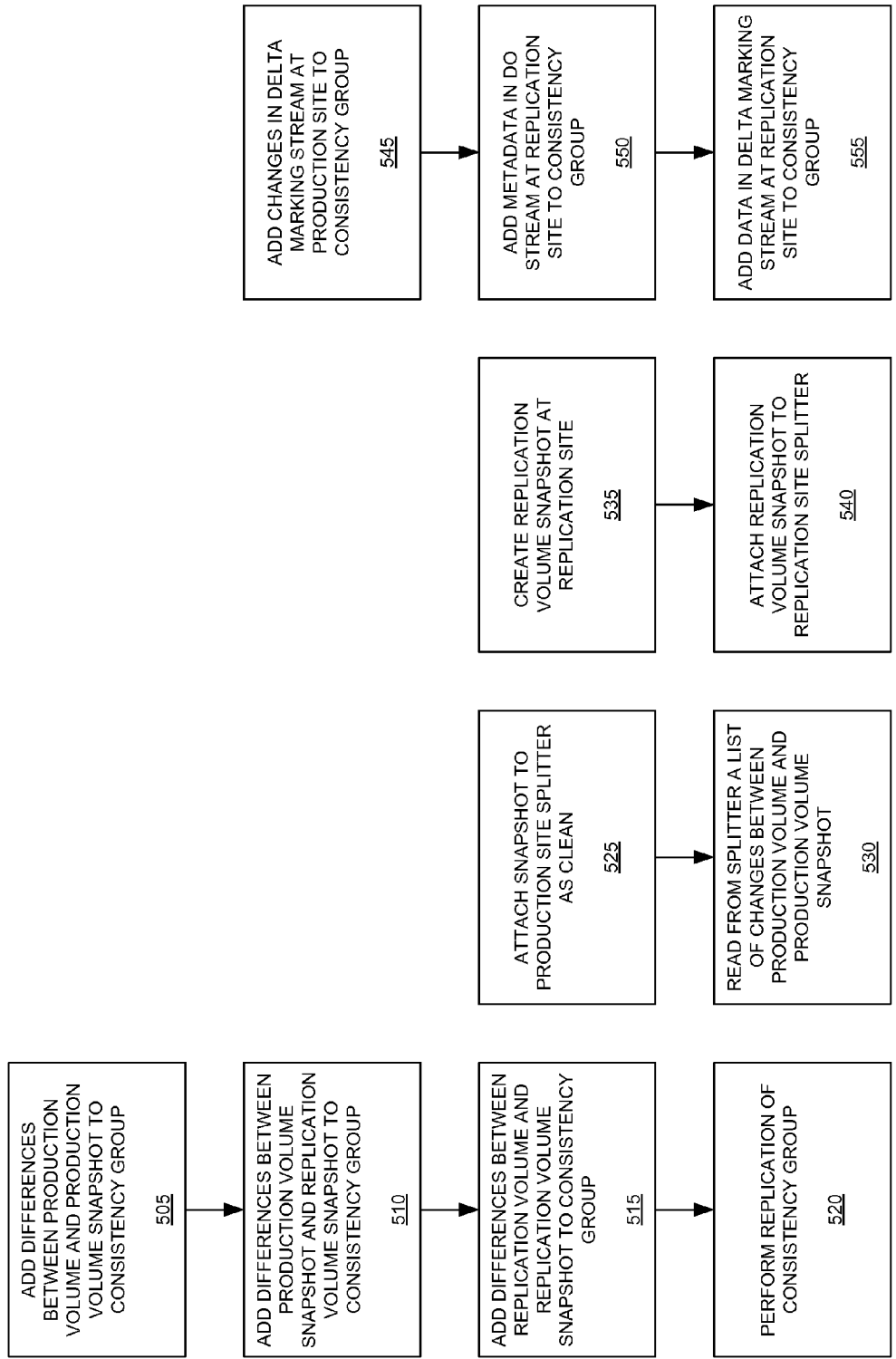

In a first example embodiment illustrated in FIGS. 3A-3B and 4, the snapshot S may be replicated as it is created in storage 408 at the production site. The storage 408 may be array-based storage. In a preferred embodiment, replication management is integrated with the storage 408 (i.e., while the DPA 412 may but need not be integrated in the storage 408, the replication management functions/processes are integrated in the storage 408). Accordingly, at the production site, the storage 408 notifies or instructs the production site DPA 412 to quiesce all new I/O commands received at the DPA 412 from a host 404 via a switch 448 (305).

With the I/O commands quiesced, thereby providing an opportunity to take a consistent snapshot, the storage 408 creates a snapshot S of the production volume (310) (or set of volumes). Accordingly, replication is not stopped; rather the quiesce process delays processing of new I/Os for a short period of time (e.g., a millisecond). It should be understood that the DPA 412 may receive the I/O commands from the splitter 410 which receives the I/O commands from the host and splits them to both the production volume V and the DPA 412. The DPA 412 also creates a bookmark BM which is a logical marker indicating which I/Os belong to a point in time and which are not. The bookmark BM is then sent to the DPA 424 and stored in a do metadata stream of the replication site journal (315) indicating the point in time of the journal protection window that the snapshot S was taken. The storage 408 then notifies or instructs the production site DPA 412 to unquiesce I/O commands received from the host 404 (320).

As described above, the data in the do stream, with the help of the do metadata stream, of the replication site journal 476 will be applied to the replication site volume V'. When encountering the bookmark BM from the replication site journal 476 in the do metadata stream, the replication site DPA 424 takes a snapshot $S_1'$ of the replication site volume V'. Because I/Os were quiesced above, the snapshot S' is identical to snapshot S.

Figure 6:
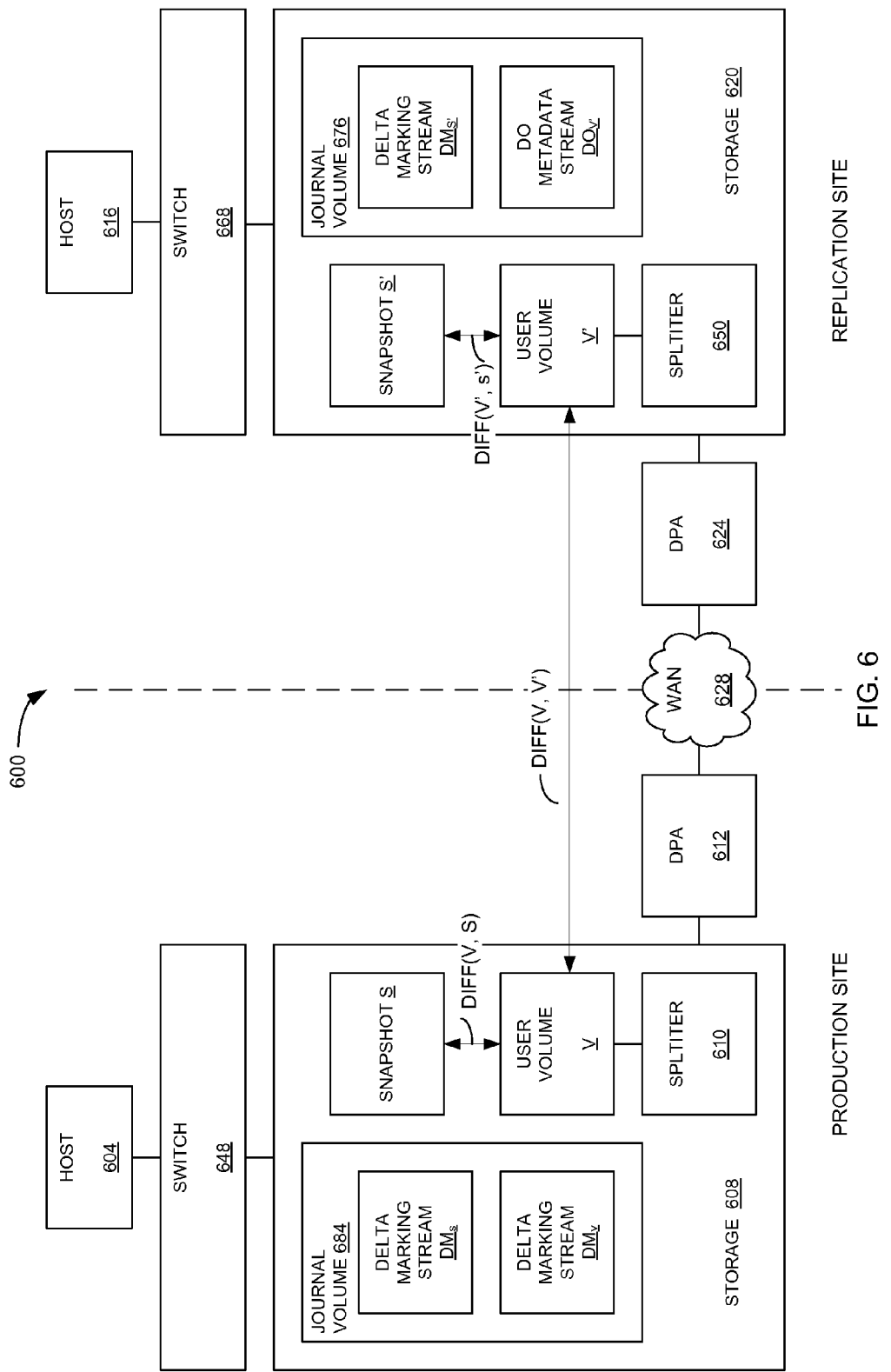

FIGS. 5A-5D are flow diagrams illustrating example methods for replicating an existing snapshot of a production volume at a production site storage array to a snapshot of a replication volume at a replication site storage array according to an example embodiment of the present invention. The flow diagrams of FIGS. 5A-5D may be read in conjunction with the block diagram of FIG. 6 illustrating a replication environment 600 including a production site and a replication site, with a snapshot S at the production site being replicated to a replica snapshot S' at the replication site.

In a second example embodiment illustrated in FIGS. 5A-5D and 6, the replication environment 600 may include a volume (i.e., user volume) V and a snapshot S at a production site and a replication volume V' at a replication site. Here, the production site already includes a set of snapshots to be replicated. In certain scenarios, such as asynchronous replication, volumes V and V' may not be identical at a particular point in time. Additionally, there may be differences between the production volume V and a production site snapshot S if, for example, I/O commands received by the splitter 610 have been written to the production volume V after the snapshot S was created.

Accordingly, there may be an interface, such as an application programming interface (API), between the splitter 610 and the storage 608 at the production site to determine the differences between the production volume V and the production site snapshot S. The API allows the splitter 610 to read a list of locations which are different between the volume (e.g., the production volume V or the replication volume V') and the snapshot (e.g., production site snapshot S or replication site snapshot S'). To replicate the production site snapshot S, if the snapshot S is among a plurality of snapshots, a production site snapshot S is chosen for replications, such as by a user. The production site DPA 612 then identifies the production site snapshot S as a snapshot of the production volume V, which is replicated to replication volume V', by querying the storage 608 and checking the DPA 612 state. The replication site DPA 624 then creates a replication site snapshot S' of the replication volume V' at the replication site.

The production site DPA 612 automatically creates a consistency group where the source volume is the production site snapshot S and the target volume is the replication site snapshot S'. Both volumes (i.e., the production and replication site snapshots S, S') are attached to their respective splitters (e.g., splitters 610, 650) as clean (i.e. the delta marker stream is not marked that the volumes S,S' are different). Accordingly, new I/Os arriving to the production and replication site snapshots S, S' are tracked in the respective delta marking streams of the consistency group (e.g., $DM_S$ at production site for the production site snapshot S and $DM_S'$ at replication site for the replication site snapshot S').

Before replication between the production site snapshot S and the replication site snapshot S' can start, the differences between the snapshots S, S' must be built. First the current differences between the production site volume V and the replication site volume V' (i.e., DIFF(V, V')) are added to the marking stream $DM_S$. The difference DIFF(V, V') includes the data currently in the delta marking stream of the production site volume V (e.g., $DM_V$), plus the data still in the do stream at the replication site (e.g., $DO_V$), plus, if the replication site is in an image access mode the locations in the image access stream containing V and V' at the replication site (e.g., $DM_S'$).

The differences between the production site volume V and the production site snapshot S (i.e., DIFF(V, S)) are read through the production site splitter 610 and added to the production site delta marking stream $DM_S$, at the production site and the differences between the replication site volume V' and the replication site snapshot S' (i.e., DIFF(V', S')) are read through the replication site splitter 650 and added to the replication site delta marking stream $DM_S'$ at the replication site. As a result, the delta marking streams of the consistency group containing the production snapshot S and the replication snapshot S' (e.g., production site delta marking stream $DM_S$ and replication site delta marking stream $DM_S'$) include the locations suspected as different between the production site snapshot S and the replication site snapshot S'. Accordingly, replication from the production site snapshot S to the replication site snapshot S' may begin, with replication merging the respective delta marking streams $DM_S$, $DM_S'$ into the production site delta marking stream $DM_S$. Therefore, only these different locations need to be resynchronized to provide continuous replication between the production snapshot S and the replication snapshot S'.

It should be understood that the production site may include a plurality of volumes in a consistency group and that the method described above may be performed for all volumes in the consistency group.

Figure 7:
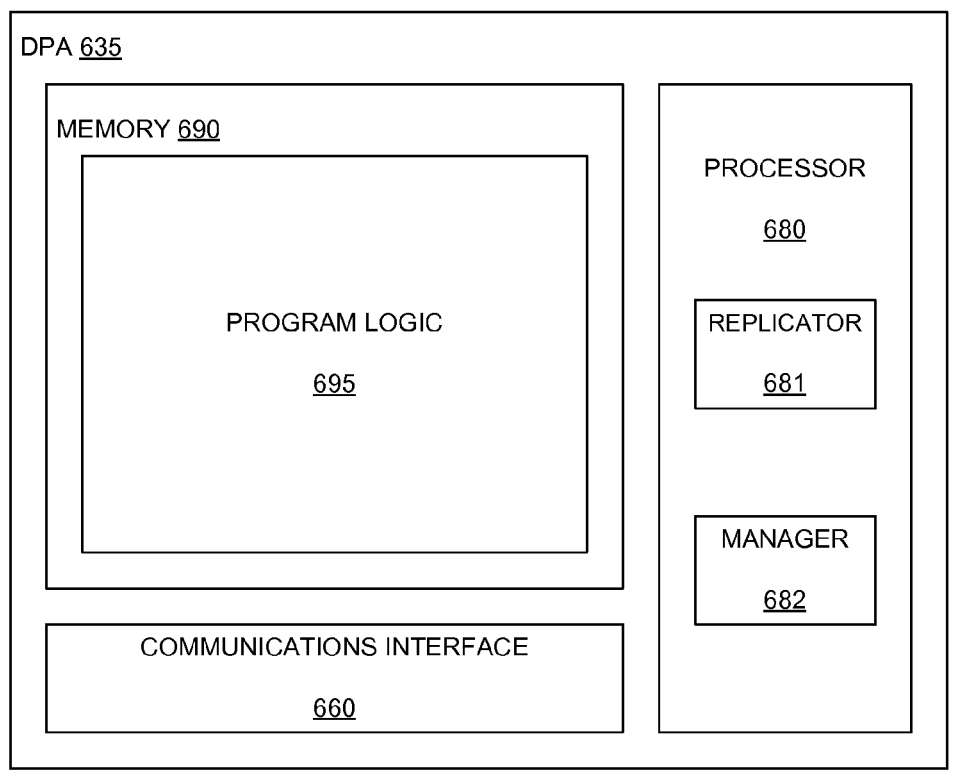
FIG. 7 is a block diagram of an example embodiment apparatus according to the present invention.

FIG. 7 is a block diagram of an example embodiment DPA 735 according to the present invention. The DPA includes memory 790 storing program logic 795, a processor 780, a communications interface 760, a monitor 770 and a manager 775.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 8:
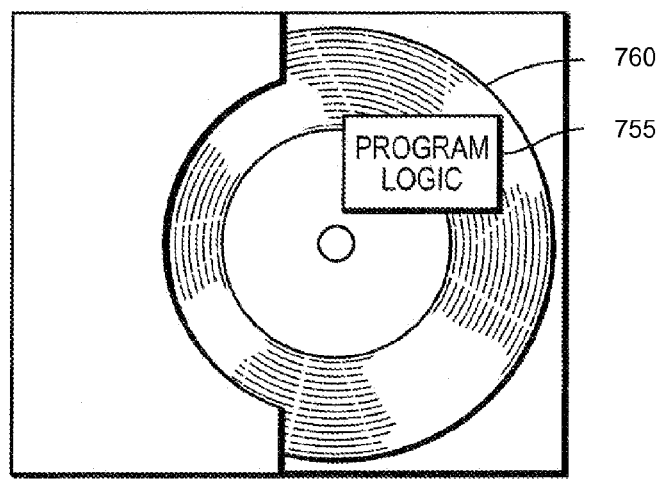
FIG. 8 is an illustration of an example embodiment of the present invention as embodied in program code.

FIG. 8 shows program logic 855 embodied on a computer-readable medium 860 as shown, and wherein the logic is encoded in computer-executable code configured for carrying out the gas controlling process of this invention and thereby forming a computer program product 800.

The logic for carrying out the method may be embodied as part of the aforementioned system, which is useful for carrying out a method described with reference to embodiments shown in, for example, FIGS. 3A-3B and 5A-5D. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
   creating a snapshot of a production volume at a production site storage array;
   creating a bookmark indicative of a point in time the snapshot of the production volume was created;
   replicating the bookmark from a production site replication appliance to a replication site replication appliance; and
   creating a replica of the snapshot of the production volume at the production site storage array at the replication site storage array by creating a snapshot of a replication volume at a replication site storage array according to the replicated bookmark.

2. The method of claim 1 further comprising:
   prior to creating the snapshot, notifying a production site replication appliance to quiesce commands received by the production site replication appliance; and
   after creating the bookmark, notifying the production site replication appliance to unquiesce commands received by the production site replication appliance.

3. The method of claim 1 wherein replicating the bookmark from a production site replication appliance to a replication site replication appliance comprises:
   sending the bookmark to the replication site; and
   storing the bookmark in a do metadata stream of a journal maintained at the replication site.

4. The method of claim 3 further comprising:
   applying data to the replication volume from the do metadata stream of the journal maintained at the replication site; and
   creating the snapshot of the replication volume at the replication site if the data applied to the replication volume from the do metadata stream is the bookmark.

5. A system comprising:
   a production site, comprising a production site replication appliance and a production site storage array, configured to create a snapshot of a production volume at the production site storage array, create a bookmark indicative of a point in time the snapshot of the production volume was created, and replicate the bookmark to a replication site; and
   a replication site, comprising a replication site replication appliance and a replication site storage array, configured to create a replica of the snapshot of the production volume at the production site storage array at the replication site storage array by creating a snapshot of a replication volume at the replication site storage array according to the replicated bookmark.

6. The system of claim 5 wherein the production site is further configured to notify the production site replication appliance to quiesce commands received by the production site replication appliance prior to creating the snapshot and notify the production site replication appliance to unquiesce commands received by the production site replication appliance after creating the bookmark.

7. The system of claim 5
   wherein the production site is further configured to send the bookmark to the replication site; and
   wherein the replication site is further configured to store the bookmark in a do metadata stream of a journal maintained at the replication site.

8. The system of claim 7 wherein the replication site is further configured to apply data to the replication volume from the do metadata stream of the journal maintained at the replication site and create the snapshot of the replication volume at the replication site if the data applied to the replication volume from the do metadata stream is the bookmark.

9. A computer-program product including a non-transitory computer-readable storage medium encoded with computer-program code that, when executed on a processor of a computer, cause the computer to replicate a snapshot, the computer-program code comprising:
   computer-program code for creating a snapshot of a production volume at a production site storage array;
   computer-program code for creating a bookmark indicative of a point in time the snapshot of the production volume was created;
   computer program code for replicating the bookmark from a production site replication appliance to a replication site replication appliance; and
   computer program code for creating a replica of the snapshot of the production volume at the production site storage array at the replication site storage array by creating a snapshot of a replication volume at a replication site storage array according to the replicated bookmark.

10. The computer-program product of claim 9 further comprising:
    computer-program code for notifying a production site replication appliance to quiesce commands received by the production site replication appliance prior to creating the snapshot; and
    computer-program code for notifying the production site replication appliance to unquiesce commands received by the production site replication appliance after creating the bookmark.

11. The computer-program product of claim 9
    wherein computer-program code for replicating the bookmark from a production site replication appliance to a replication site replication appliance comprises:
    computer-program code for sending the bookmark to the replication site; and computer-program code for storing the bookmark in a do metadata stream of a journal maintained at the replication site; and wherein computer-program code for creating a replica of the snapshot of the production volume at the production site storage array by creating a snapshot of a replication volume at a replication site storage array according to the replicated bookmark comprises:

computer-program code for applying data to the replication volume from a do metadata stream of the journal maintained at the replication site; and computer-program code for creating the snapshot of the replication volume at the replication site if the data applied to the replication volume from the do metadata stream is the bookmark.

12. A method comprising:

generating, by one or more splitters, a list of differences between a snapshot of a production site volume at a production site storage array and a snapshot of a replication site volume at a replication site storage array, the production site volume replicated to the replication site volume via a production site replication appliance and a replication site replication appliance;

replicating the list of differences between the snapshot of the production site volume at the production site storage array and the snapshot of the replication site volume at the replication site storage array via the production site replication appliance and the replication site replication appliance; and creating a replica of the snapshot of the production volume at the production site storage array at the replication site storage array by applying the replicated list of differences at the replication site storage array to the snapshot of the replication volume at the replication site storage array.

13. The method of claim 12 wherein generating, by one or more splitters, a list of differences between a snapshot of a production site volume at a production site storage array and a snapshot of a replication site volume at a replication site storage array, the production site volume replicated to the replication site volume via a production site replication appliance and a replication site replication appliance comprises:

determining differences between the production site volume and the snapshot of the production site volume;

determining differences between the production site volume and the replication site volume; and determining differences between the replication site volume and the snapshot of the replication site volume.

14. The method of claim 13 wherein determining differences between the production site volume and the snapshot of the production site volume comprises obtaining from a production site splitter a list of changes between the production site volume and the snapshot of the production site volume.

15. The method of claim 13 wherein determining differences between the production site volume and the replication site volume comprises:

obtaining data in a delta marking stream of the production site volume;

obtaining data in a do stream at the replication site; and obtaining locations in an image access stream if the replication site is in an image access mode.

16. The method of claim 13 wherein determining differences between the replication site volume and the snapshot of the replication site volume comprises obtaining from a replication site splitter a list of changes between the replication site volume and the snapshot of the replication site volume.

17. The method of claim 12 further comprising:

creating a consistency group for the production site volume and the replication site volume;

attaching the snapshot of the production site volume to a production site splitter as clean; and attaching the snapshot of the replication site volume to a replication site splitter as clean.

18. A system comprising:

a production site comprising a production site replication appliance and a production site storage array;

a replication site comprising a replication site replication appliance and a replication site storage array; and one or more splitters configured to generate a list of differences between a snapshot of a production site volume at the production site storage array and a snapshot of a replication site volume at the replication site storage array;

the production site replication appliance configured to replicate the production site volume, the list of differences between the snapshot of the production site volume at the production site storage array, and the snapshot of the replication site volume at the replication site storage array to the replication site via the replication site replication appliance; and the replication site replication appliance configured to create a replica of the snapshot of the production volume at the production site storage array at the replication site storage array by applying the replicated list of differences at the replication site storage array to the snapshot of the replication volume at the replication site storage array.

19. The system of claim 18 wherein the one or more splitters are further configured to determine differences between the production site volume and the snapshot of the production site volume, determine differences between the production site volume and the replication site volume, and determine differences between the replication site volume and the snapshot of the replication site volume.

20. The system of claim 19 wherein the production site is further configured to obtain from a production site splitter a list of changes between the production site volume and the snapshot of the production site volume.

21. The system of claim 19 wherein the production site is further configured to obtain data in a delta marking stream of the production site volume, obtain data in a do stream at the replication site, and obtain locations in an image access stream if the replication site is in an image access mode.

22. The system of claim 19 wherein the production site is further configured to obtain from a replication site splitter a list of changes between the replication site volume and the snapshot of the replication site volume.

23. The system of claim 18 wherein the production site replication appliance is further configured to create a consistency group for the production site volume and the replication site volume, attach the snapshot of the production site volume to a production site splitter as clean, and attach the snapshot of the replication site volume to a replication site splitter as clean.

24. A computer-program product including a non-transitory computer-readable storage medium encoded with computer-program code that, when executed on a processor of a computer, cause the computer to replicate a snapshot, the computer-program code comprising:

computer-program code for generating, by one or more splitters, a list of differences between a snapshot of a production site volume at a production site storage array and a snapshot of a replication site volume at a replication site storage array, the production site volume replicated to the replication site volume via a production site replication appliance and a replication site replication appliance;

computer-program code for replicating the list of differences between the snapshot of the production site volume at the production site storage array and the snapshot of the replication site volume at the replication site storage array via the production site replication appliance and the replication site replication appliance; and computer-program code for creating a replica of the snapshot of the production volume at the production site storage array at the replication site storage array by applying the replicated list of differences at the replication site storage array to the snapshot of the replication volume at the replication site storage array.

25. The computer-program product of claim 24 wherein computer-program code for generating, by one or more splitters, a list of differences between a snapshot of a production site volume at a production site storage array and snapshot if a replication site volume at a replication site storage array, the production site volume replicated to the replication site volume via a production site replication appliance and a replication site replication appliance, comprises:

computer-program code for determining differences between the production site volume and the snapshot of the production site volume;

computer-program code for determining differences between the production site volume and the replication site volume; and computer-program code for determining differences between the replication site volume and the snapshot of the replication site volume.

26. The computer-program product of claim 25 wherein computer-program code for determining differences between the production site volume and the snapshot of the production site volume comprises computer-program code for obtaining from a production site splitter a list of changes between the production site volume and the snapshot of the production site volume; and wherein computer-program code for determining differences between the replication site volume and the snapshot of the replication site volume comprises computer-program code for obtaining from a replication site splitter a list of changes between the replication site volume and the snapshot of the replication site volume.

27. The computer-program product of claim 25 wherein computer-program code for determining differences between the production site volume and the replication site volume comprises:

computer-program code for obtaining data in a delta marking stream of the production site volume;

computer-program code for obtaining data in a do stream at the replication site; and computer-program code for obtaining locations in an image access stream if the replication site is in an image access mode.

28. The computer-program product of claim 24 further comprising:

computer-program code for creating a consistency group for the production site volume and the replication site volume;

computer-program code for attaching the snapshot of the production site volume to a production site splitter as clean; and computer-program code for attaching the snapshot of the replication site volume to a replication site splitter as clean.

* * * * *